Sept. 15, 1959  R. L. CARLSTEDT  2,903,916
APPARATUS FOR PREVENTING VIBRATION OF BORING BARS
Filed Feb. 27, 1957  2 Sheets-Sheet 1
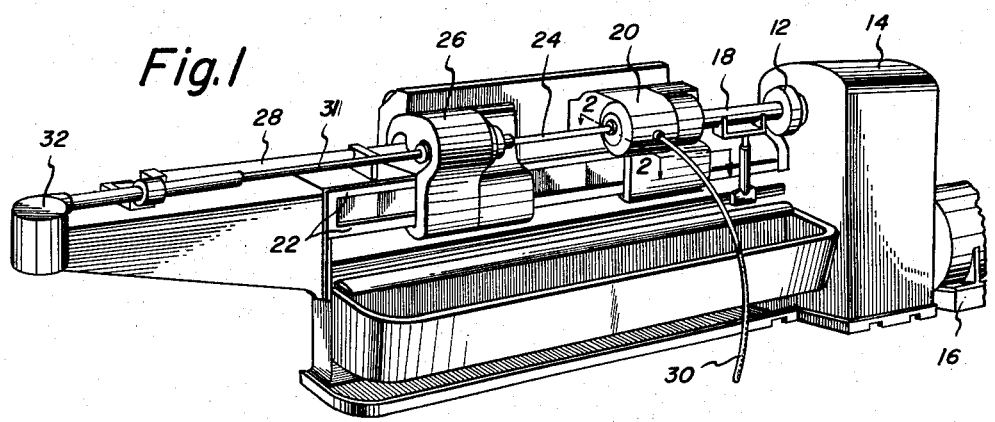
Fig. 1
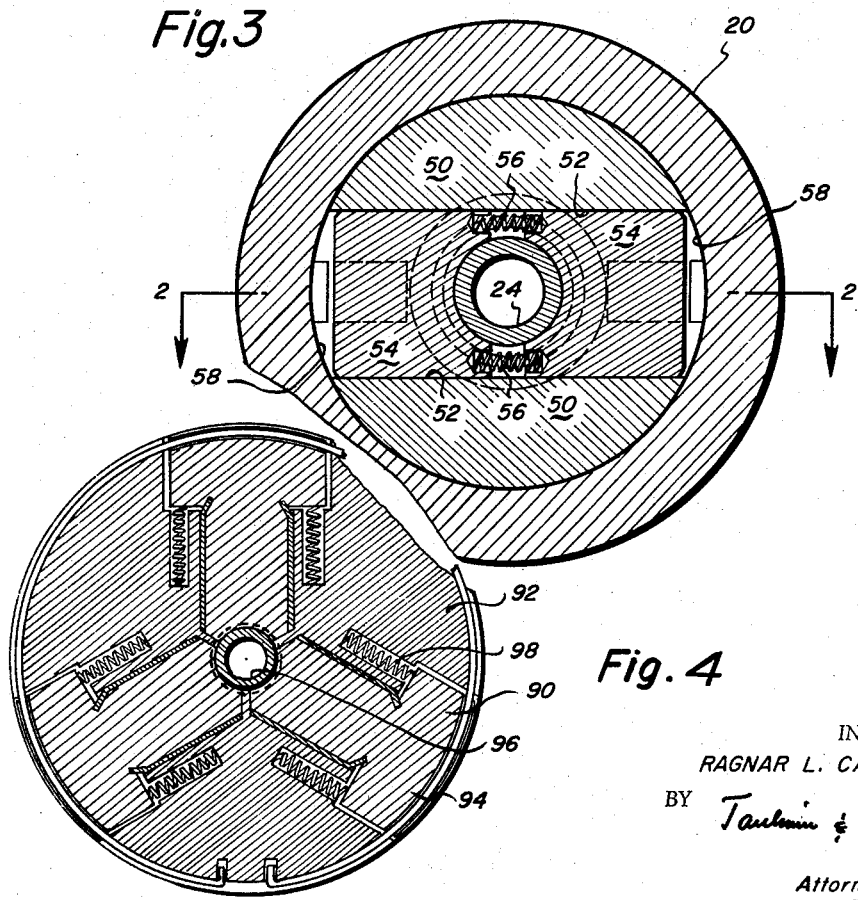
Fig. 3
Fig. 4
INVENTOR.
RAGNAR L. CARLSTEDT
BY
Attorneys Sept. 15, 1959  R. L. CARLSTEDT  2,903,916
APPARATUS FOR PREVENTING VIBRATION OF BORING BARS
Filed Feb. 27, 1957  2 Sheets-Sheet 2

INVENTOR
RAGNAR L. CARLSTEDT
By Taulmin & Taulmin
Attorneys

United States Patent Office 2,903,916
Patented Sept. 15, 1959

2,903,916

APPARATUS FOR PREVENTING VIBRATION OF BORING BARS

Ragnar Leonard Carlstedt, Cincinnati, Ohio, assignor to The R. K. LeBlond Machine Tool Co., Cincinnati, Ohio, a corporation of Delaware Application February 27, 1957, Serial No. 642,826

5 Claims. (Cl. 77—3)

This invention relates to boring machines and in particular to boring machines adapted for boring deep holes at a rapid rate in workpieces. More particularly still, this invention is concerned with a boring machine in which the workpiece rotates and the boring bar is held against rotation while the boring bar and workpiece are moved axially relative to each other to force the cutting tool portion of the boring bar into the work.

Due to the fact that boring machines of the nature referred to above are sometimes required to bore holes of especially great length, it follows that the boring bars will sometimes be of considerable length. Such bores are not always of large diameter, and the boring bars are thus quite often relatively slender. Such boring bars have a tendency to deflect and vibrate, and this, of course, detracts from the quality of the hole being bored. It is customary to employ guide bushings and the like for guiding the boring bars, but heretofore such guide bushings have been of a type that provided for support of the boring bar by maintaining an extremely small clearance thereabout. Such a guide bushing is not always satisfactory for maintaining the boring bar free of vibration.

Having the foregoing in mind, it is a primary object of the present invention to provide an improved guide bushing arrangement for the boring bar of the boring machine of the nature referred to.

Another object of this invention is the provision of a guide arrangement for the boring bar of a boring machine which will maintain substantially a constant and uniform friction between the boring bar and the guiding means throughout the travel of the boring bar therethrough.

A still further object of the present invention is the provision of a guide bushing arrangement for a boring bar for a deep hole boring machine in which small irregularities in the surface of the boring bar will not effect scoring of the bushing or detracting from the guiding efficiency thereof.

A still further object of the present invention is the provision of a guide bushing arrangement for the boring bars of deep hole boring machines of the nature referred to in which the guide bushing is effective for supporting the boring bar directing working operation thereof only while permitting free movement of the boring bar within predetermined limits when the boring bar is being retracted.

It is also an object of this invention to utilize the pressure of the cooling fluid being supplied to the boring bar for assisting in the guiding of the boring bar.

These and other objects and advantages of this invention will become more apparent upon reference to the following specification taken in connection with the accompanying drawings, wherein:

Figure 1 is a perspective view of a boring machine according to the present invention;

Figure 3 is a cross-sectional view indicated by line 3—3 on Figure 2, showing the arrangement within the clamp of the shoes or blocks that form the portion of the guide bushing that directly engages the boring bar; and Figure 4 is a transverse section, like Figure 3, but shows a somewhat different arrangement of the guide bushing.

Figure 2:
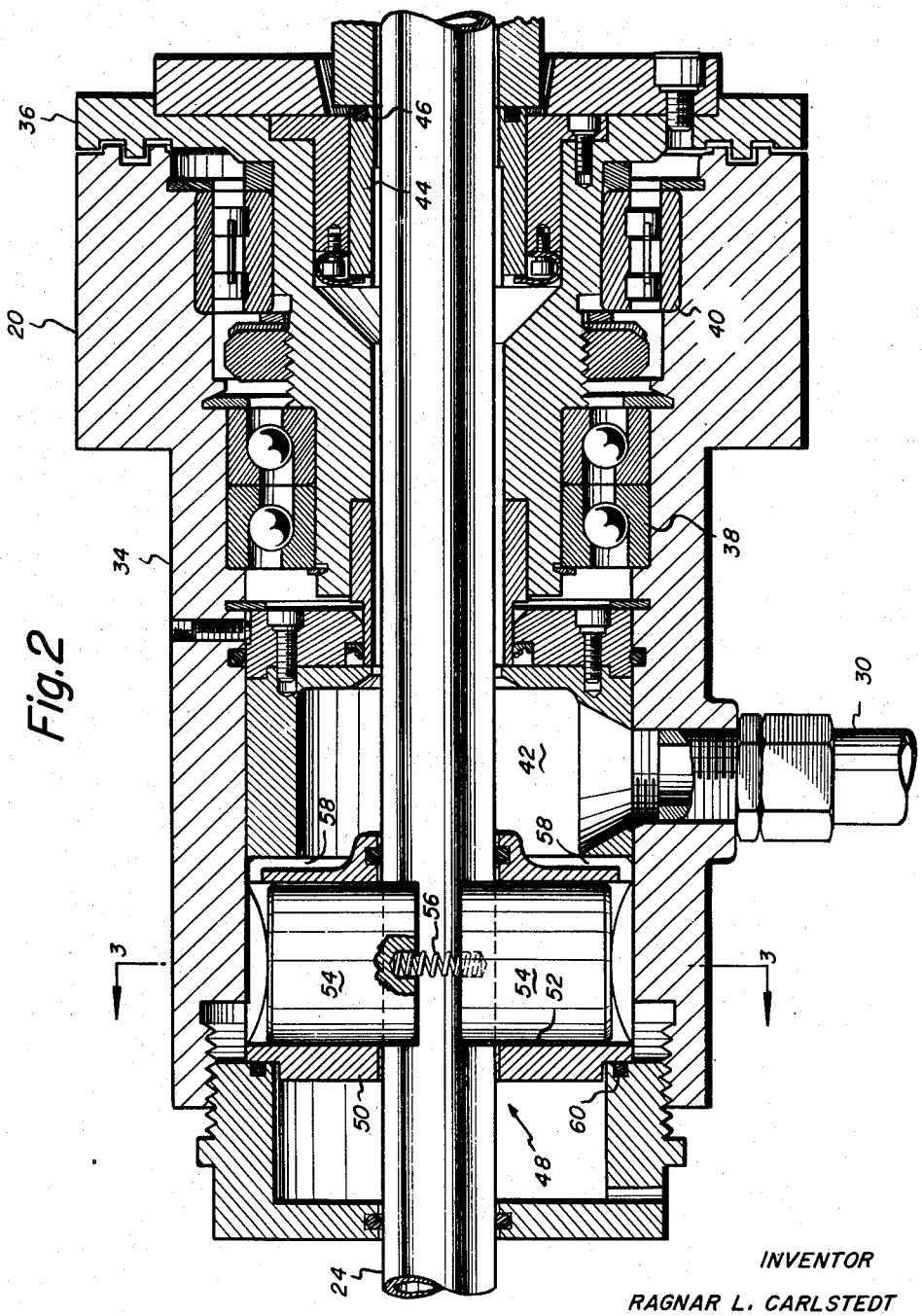
Figure 2 is a sectional view indicated by line 2—2 on Figure 1 showing a cross-section of the clamp at one end of the workpiece being bored, and in which clamp there is located the guide bushing according to the present invention.

Referring to the drawings somewhat more in detail, Figure 1 is a perspective view and shows in general a boring machine according to the present invention, and which machine comprises a frame which has at one end a spindle 12 driven by a drive mechanism such as V belts located within end casting 14 and receving power from an electric motor 16.

Spindle 12 is adapted for drivingly engaging one end of a workpiece 18, the other end of which is engaged by a clamp 20 slidably supported on frame 10 as upon the ways 22. A hydraulic motor may be employed for urging clamp 20 rightwardly into engagement with the left end of workpiece 18 whereby the workpiece is supported within the machine. As will be seen in Figure 2, the portion of clamp 20 that engages workpiece 18 is rotatable so that driving of spindle 12 will cause rotation of workpiece 18.

The machine comprises a tubular boring bar 24 which extends sealingly into the left end of clamp 20 and engages work member 18. The left end of boring bar 24 is fixed to a boring slide 26 slidable along ways 22 and adapted for being driven therealong by a hydraulic motor 28.

The clamp 20 is adapted for receiving a supply of cooling liquid such as cutting oil under high pressure up to, say, 600 to 800 pounds per square inch, via a conduit 30; and, this cooling fluid passes through the clamp and along the bore formed by the boring bar, and thence into the open right end of the boring bar and then leftwardly through the hollow boring bar carrying with it the chips cut from the workpiece.

This mixture of cooling fluid and chips passes through boring head 26 and into the telescopic discharge pipe 31, the left end of which is conected into cyclone 32, wherein the velocity of the fluid is reduced, and it is then passed into a filter or settling tank so that substantially clean fluid can be returned to the pressure side of the cooling fluid system.

Figure 2 shows a longitudinal section through the clamp 20. This member will be seen to comprise a casing 34 which is stationary, and a rotatable part 36 supported within the stationary frame as by the antifriction bearings 38 and 40.

The cooling fluid that is supplied via conduit 30 enters a chamber 42 within the clamp 20, and then passes rightwardly in the space above boring bar 24, and through sleeve 44 into the bore in workpiece 18. Sleeve 44 seals against the end of the workpiece by means of O ring 46, so that there is no leakage of the cooling fluid at this point.

According to the present invention, the boring bar is supported and guided and held against vibration by means of a guide bushing arrangement generally indicated at 48. This guide bushing arrangement is in the form of a block 50 having formed therein the bores 52 in which the blocks or shoes 54 are slidably mounted. These blocks or shoes, as will be seen in Figure 3, substantially encircle the boring bar 24 and thus provide support against vibration thereof in all directions. The inner ends of the blocks or shoes 54 on the opposite sides of boring bar 24 are provided with recesses within which are mounted compression springs 56 serving to urge the shoes or blocks apart.

In order to press the blocks together and toward the surface of the boring bar, the pressure of the supply of cooling liquid to the clamp member 20 is availed of by connecting the outer ends of the bores 52 with chamber 42. This is accomplished by the slots or grooves 58 cut into the block 50 on the side thereof toward chamber 42.

The oil so supplied is prevented from leaking out the left end of block 50 by the sealing O ring 60; and, thus there is built up in the outer ends of bores 52 a substantial pressure thrusting the blocks or shoes 54 inwardly against the boring bar 24. The shoes or blocks 54 are preferably made of Babbitt metal, or other fairly soft bearing material; and, because of this, their engagement with the boring bar is substantially friction free, and this permits the boring bar to be reciprocated readily through clamp 20 while being firmly held therein against vibration.

It is to be noted that the blocks or shoes 54 are of substantial size and weight, and this tends to have a damping action on any vibrations transmitted thereto through the boring bar 24. In addition, the body of oil bearing on the outer ends of the blocks or shoes likewise contributes inertia influence tending to damp out the vibrations whereby the boring bar is held steady within the clamp.

The high velocity cooling fluid being forced along the outside of the boring bar and within the bore in the workpiece being operated provides a cushion along the entire length of the boring bar; and, in this manner, true and accurate holes are bored in workpieces even though the bore is of considerable length.

In both of the modifications described, the supporting and guiding of the boring bar takes place during its working movement when there is a supply of pressure fluid to the boring bar and the work while during retracting movement of the boring bar high pressure is absent from the guide bushing and the boring bar is free to move thereto in being withdrawn from the work.

In Figure 4, there is illustrated an arrangement wherein there are provided three (3) uniformly angularly spaced guide shoes 90 positioned within a supporting block 92, and adapted for being detachably retained in position by a snap spring arrangement 94. It will be noted that the grooves in which the spring arrangement 94 rests provide passage means through which pressure fluid can be conducted to the blocks or shoes 90, thereby to urge them inwardly into supporting and guiding arrangement with the boring bar 96.

Compression springs 98 are disposed beneath the guide shoes or blocks 90 for urging them outwardly so that during retracting movement of the boring bar when the pressure of the coolant fluid is relieved the guide shoes or blocks will retract thus permitting free movement of the said boring bar.

It will be evident that the arrangement of Figure 4 is substantially identical with the previously described modifications, for example, that of Figure 3; and, in addition, provides for damped movement of the boring bar in substantially any direction, whereas in the Figure 3 modification the principal dampening effect will be in the direction of the length of the guide blocks 54.

It will be understood that this invention is susceptible to modification in order to adapt it to different usages and conditions; and, accordingly, it is desired to comprehend such modifications within this invention as may fall within the scope of the appended claims.

I claim:

1. In a boring machine; a spindle driven in rotation, a workpiece clamp spaced from the spindle and having a rotatable portion on the spindle side thereof to engage said workpiece, there being means associated with the spindle for drivingly engaging said workpiece for rotating the same, said clamp having a longitudinal bore therethrough, a non-rotative boring bar extending through said bore and engaging the workpiece on the axis of rotation thereof whereby rotation of the workpiece will cause boring thereof by the said bar, a supply of coolant fluid under pressure connected to said bore, means for supplying coolant fluid to the workpiece along the outside of said boring bar during a boring operation and for interrupting the supply during retraction of the boring bar, and means in the clamp adapted for slidably engaging the boring bar and supporting it against deflection and vibration during a boring operation, said means being spring urged away from the boring bar and being urged toward the boring bar by the pressure of said coolant fluid whereby to be effective during a boring operation while there is a coolant fluid supply to the boring bar while being ineffective during a retracting movement of the boring bar when the coolant fluid supply is interrupted.

2. In a boring machine; a frame, a rotatable spindle in the frame, a workpiece clamp spaced from the spindle having a rotatable portion on the spindle side thereof adapted for clamping an elongated workpiece between the spindle and the said portion so the workpiece will be driven by the spindle, said clamp having an axial bore therethrough on the axis of rotation of the workpiece, a non-rotative boring bar extending through the clamp on said axis so as to engage the workpiece and cause boring thereof as the workpiece rotates, and vibration preventing shoes in the clamp slidably engaging the boring bar at points spaced about the periphery thereof and normally spring urged away from the boring bar, a supply of coolant adapted for being placed under pressure during a boring operation connected to the bore in the clamp between the said shoes and the workpiece, and means hydraulically connecting the said bore with the outer ends of said shoes whereby said shoes are thrust inwardly toward the boring bar by the pressure on the coolant, the thrust developed by the coolant on the shoes being greatly in excess of the thrust of the spring on the shoes.

3. In a boring machine; a frame, a rotatable spindle in the frame, a workpiece clamp spaced from the spindle having a rotatable portion on the spindle side thereof adapted for clamping an elongated workpiece between the spindle and the said portion so the workpiece will be driven by the spindle, said clamp having an axial bore therethrough on the axis of rotation of the workpiece, a non-rotative boring bar extending through the clamp on said axis so as to engage the workpiece and cause boring thereof as the workpiece rotates, and vibration preventing shoes in the clamp slidably engaging the boring bar at points spaced about the periphery thereof, a supply of coolant adapted for being placed under pressure during a boring operation connected to the bore in the clamp between the said shoes and the workpiece, and a block in the clamp having a bore through which the boring bar extends with radial clearance, radial bore means in said block intersecting the bore through which the said bar passes, said shoes being mounted in said radial bore means, means hydraulically connecting the outer ends of said shoes with the bore in said clamp whereby the pressure of the coolant supply thrusts the said shoes inwardly into supporting engagement with the boring bar, and springs urging said shoes outwardly away from said boring bar with a thrust substantially less than that developed on the shoes by the coolant.

4. In a boring machine; a frame, a rotatable spindle in the frame, a workpiece clamp spaced from the spindle having a rotatable portion on the spindle side thereof adapted for clamping an elongated workpiece between the spindle and the said portion so the workpiece will be driven by the spindle, said clamp having an axial bore therethrough on the axis of rotation of the workpiece, a non-rotative boring bar extending through the clamp on said axis so as to engage the workpiece and cause boring thereof as the workpiece rotates, and vibration preventing shoes in the clamp slidably engaging the boring bar at points spaced about the periphery thereof, a supply of coolant adapted for being placed under pressure during a boring operation only connected to the bore in the clamp between the said shoes and the workpiece, and a block in the clamp having a bore through which the boring bar extends with radial clearance, radial bore means in said block intersecting the bore through which the said bar passes, said shoes being mounted in said radial bore means, and means hydraulically connecting the outer ends of said shoes with the bore in said clamp whereby the pressure of the coolant supply thrusts the said shoes inwardly into supporting engagement with the boring bar, there being compression spring means urging said shoes outwardly so that upon interruption of the supply of coolant under pressure at the end of a boring operation the said shoes will permit free movement of the boring bar in retraction through the clamp.

5. In a boring machine of the nature described; a workpiece clamp adapted for clamping a workpiece against a spindle to be driven in rotation thereby, a non-rotative boring bar extending axially through the clamp so as to engage the end of the workpiece, a block in the clamp having a bore through which the boring bar passes, a connection to the interior of the clamp external of the boring bar between the block and the workpiece end of the clamp, seal means between the said connection and the bore through the block, means located in said block hydraulically connected with said coolant connection operable in response to pressure supplied to said connection for slidably engaging said boring bar for the support thereof against vibration and deflection as it advances through said clamp during a boring operation, said means comprising a plurality of radial shoes mounted in the block spring-pressed outwardly therein and subjected to said pressure at their outer ends only so as to be thrust inwardly thereby, and means for supplying coolant under pressure to said coolant connection only while the boring bar is advancing toward the workpiece.

References Cited in the file of this patent
UNITED STATES PATENTS

| | | |
|---|---|---|
| 603,260 | Cook | May 3, 1898 |
| 611,984 | Wright | Oct. 4, 1898 |
| 1,499,332 | Baumann | July 1, 1924 |
| 2,697,610 | Ovshinsky | Dec. 21, 1954 |

FOREIGN PATENTS

| | | |
|---|---|---|
| 1,096,352 | France | June 20, 1955 |